(12) United States Patent
Zhang et al.

(10) Patent No.: US 10,916,771 B2
(45) Date of Patent: Feb. 9, 2021

(54) METALLIC SODIUM AND SODIUM-TIN BINARY ALLOY ELECTRODE

(71) Applicant: THE HONG KONG POLYTECHNIC UNIVERSITY, Hong Kong (CN)

(72) Inventors: Biao Zhang, Hong Kong (CN); Jianqiu Huang, Hong Kong (CN); Xiuyi Lin, Hong Kong (CN); Xiaoqiong Du, Hong Kong (CN); Jiaqiang Huang, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 0 days.

(21) Appl. No.: 16/402,345

(22) Filed: May 3, 2019

(65) Prior Publication Data
US 2020/0350572 A1   Nov. 5, 2020

(51) Int. Cl.
| | | |
|---|---|---|
| *H01M 4/13* | (2010.01) | |
| *H01M 4/40* | (2006.01) | |
| *H01M 4/04* | (2006.01) | |
| *H01M 4/58* | (2010.01) | |
| *H01M 4/583* | (2010.01) | |
| *H01M 4/02* | (2006.01) | |

(52) U.S. Cl.
CPC ........... *H01M 4/40* (2013.01); *H01M 4/0461* (2013.01); *H01M 4/583* (2013.01); *H01M 4/5825* (2013.01); *H01M 2004/028* (2013.01)

(58) Field of Classification Search
CPC ...... H01N 4/40; H01N 4/0461; H01N 4/5825; H01N 4/583; H01N 2004/028; H01M 4/40; H01M 4/0461; H01M 4/5825; H01M 4/583; H01M 2004/028
See application file for complete search history.

(56) References Cited

U.S. PATENT DOCUMENTS

2014/0178761 A1* 6/2014 Lu ..................... H01M 4/1397
429/225
2018/0287167 A1* 10/2018 Aryanpour .......... H01M 4/0416

OTHER PUBLICATIONS

Tu et al.; Fast ion transport at solid-solid interfaces in hybrid battery anodes; Nature Energy; 2018; pp. 310-316; vol. 3; Macmillan Publishers Limited; doi.org/10.1038/s41560-018-0096-1.

* cited by examiner

*Primary Examiner* — Jane J Rhee
(74) *Attorney, Agent, or Firm* — Spruson & Ferguson (Hong Kong) Limited

(57) ABSTRACT

Provided herein is an electrode material containing metallic sodium and at least one tin-sodium binary alloy useful in the fabrication of batteries and methods of preparation and use thereof.

19 Claims, 19 Drawing Sheets

METALLIC SODIUM AND SODIUM-TIN BINARY ALLOY ELECTRODE

TECHNICAL FIELD

The present disclosure generally relates to the field of energy storage. More particularly, the present disclosure relates to an electrode material comprising metallic sodium and at least one tin-sodium binary alloy useful in the fabrication of batteries, to a method for preparing such material and to a battery comprising such material.

BACKGROUND

Na-ion batteries (NIBs) are considered one of the most appealing alternatives to Li-ion batteries (LIBs) for stationary energy storage due to the vast abundance of Na minerals. Moreover, since sodium does not alloy with aluminum, copper current collectors currently used on the anode side of the battery could be replaced with aluminum achieving further cost savings. Currently, commercial applications of NIBs are limited due to their low energy density. High-performance anodes and cathodes for NIBs are still at a relatively early stage of development. Alloy anodes, such as Sn possess extremely high theoretical capacities (847 mAhg$^{-1}$), but suffer from poor cyclic stability due to dramatic volume changes that occur during ion insertions/desertions. Obrovac et al. have reported a 420% volume change of pure Sn upon alloying to the final phase $Na_{15}Sn_4$ (J. Electrochem. Soc. 2012, 159, A1801-A1805). As a result, pulverization of $Na_{15}Sn_4$ electrodes and loss of electrical contact takes place after repeated charge/discharge cycles, which can lead to capacity decay.

Nanostructured alloys have been utilized owing to their better resistance to fracture. However, the production of nanostructured materials can be costly and hardly scalable due to the complicated synthesis. Furthermore, the large surface area of nanomaterials can give rise to low Coulombic efficiencies owing to excessive formation of solid-electrolyte interphase (SEI).

Another approach to improve the cyclic performance of Sn electrodes is to prepare the Sn alloy or intermetallic compounds (may contain C). Such as SnSb/C, Sn—SnS—C, $Sn_4P_3$/C, and $(Sn_{0.5}Co_{0.5})_{1-x}C_x$ nanocomposite prepared by prepared by high-energy mechanical milling. Lin et al reported $Sn_{0.9}Cu_{0.1}$ nanoparticles prepared via a surfactant-assisted wet chemistry route. Liu et al. reported $Ni_3Sn_2$ microcage systemized by a template-free Ostwald ripening-based solvothermal route. In addition, ternary Sn alloys can also be beneficial to the stability of Sn anode, such as Sn—Ge—Sb and $Cu_4SnP_{10}$/MWCNTs composites. However, existing Sn electrodes can still suffer from poor cyclic stability.

Accordingly, there exists a need to develop new Sn electrode materials having improved properties.

SUMMARY

The phase transformation of $Na_xSn$ during the sodiation sequence of Na—Sn in electrodes has been extensively studied. However, formation of metallic sodium during the sodiation sequence is avoided due to safety concerns. Provided herein are electrode materials comprising metallic sodium and sodium-tin materials having improved electrochemical properties, such as increased cyclic stability. In a first aspect, provided herein is an electrode material comprising metallic sodium and at least one sodium-tin binary alloy having the formula $Na_xSn$, wherein X is 0.1-3.75 and the electrode material comprises a greater amount by mass of the at least one sodium-tin binary alloy than the mass of metallic sodium.

In a first embodiment of the first aspect, provided herein is the electrode material of the first aspect, wherein the electrode material comprises particles of the at least one sodium-tin binary alloy and metallic sodium attached thereamong.

In a second embodiment of the first aspect, provided herein is the electrode material of the first aspect, wherein the electrode material comprises substantially no crystalline metallic sodium.

In a third embodiment of the first aspect, provided herein is the electrode material of the first aspect, wherein the molar ratio of metallic sodium to the at least one sodium-tin binary alloy is 0.01:1 to 4:1.

In a fourth embodiment of the first aspect, provided herein is the electrode material of the first aspect, wherein the molar ratio of metallic sodium to the at least one sodium-tin binary alloy is 0.01:1 to 0.22:1.

In a fifth embodiment of the first aspect, provided herein is the electrode material of the first aspect, wherein the at least one sodium-tin binary alloy comprises $Na_{3.75}Sn$ or $Na_{3.75}Sn$ and $Na_{2.25}Sn$.

In a sixth embodiment of the first aspect, provided herein is the electrode material of the first aspect further comprising at least one conductive carbon material.

In a seventh embodiment of the first aspect, provided herein is the electrode material of the sixth embodiment of the first aspect, wherein the at least one conductive carbon material is selected from the group consisting of graphene, graphite, Super P, carbon fiber, and carbon black.

In an eighth embodiment of the first aspect, provided herein is the electrode material of the first aspect further comprising at least one electrode binder.

In a ninth embodiment of the first aspect, provided herein is the electrode material of the eighth embodiment of the first aspect, wherein the at least one electrode binder is sodium carboxymethylcellulose.

In a tenth embodiment of the first aspect, provided herein is the electrode material of the sixth embodiment of the first aspect further comprising at least one electrode binder; the molar ratio of metallic sodium to the at least one sodium-tin binary alloy is 0.01:1 to 1:1; and the at least one sodium-tin binary alloy comprises $Na_{3.75}Sn$ or $Na_{3.75}Sn$ and $Na_{2.25}Sn$.

In an eleventh embodiment of the first aspect, provided herein is the electrode material of the tenth embodiment of the first aspect, wherein the at least conductive carbon material is Super P and carbon fiber; and the at least one electrode binder is sodium carboxymethylcellulose.

In a second, provided herein is a method of preparing the electrode material of the first aspect, the method comprising the step of: providing a cell comprising a Sn electrode; a counter electrode which can provide Na+; and an electrolyte comprising Na; and charging or discharging the cell to below 0 volts versus a Na/Na reference electrode thereby forming the electrode material of the first aspect.

In a first embodiment of the second aspect, provided herein is the method of the second aspect, wherein the cell is charged or discharged at a capacity less than 1,600 mAh g$^{-1}$ of Sn in the Sn electrode.

In a second embodiment of the second aspect, provided herein is the method of the second aspect, wherein the cell is charged or discharged at a capacity between 400 to 800 mAh g$^{-1}$ of Sn in the Sn electrode.

In a third embodiment of the second aspect, provided herein is the method of the second aspect further comprising the steps of contacting Sn particles, at least one conductive carbon material, and at least one electrode binder thereby forming a mixture; ball milling the mixture; and coating the mixture on a copper foil thereby forming the Sn electrode.

In a third aspect, provided herein is an electrode material prepared according to the method of the second aspect.

In a fourth aspect, provided herein is a battery comprising the electrode material of the first aspect.

In a first embodiment of the fourth aspect, provided herein is the battery of the fourth aspect, wherein the battery comprises a cathode comprising $Na_{3.5}V_2(PO_4)_2F_3$ (NVPF).

In a second embodiment of the fourth aspect, provided herein is the battery of the fourth aspect, wherein the electrode has a specific capacity of 400 to 800 mAh $g^{-1}$ and has a capacity retention of greater than 90% after 50 cycles.

BRIEF DESCRIPTION OF FIGURES

The above and other objects and features of the present disclosure will become apparent from the following description of the present invention, when taken in conjunction with the accompanying drawings, in which.

DETAILED DESCRIPTION

Figure 1:
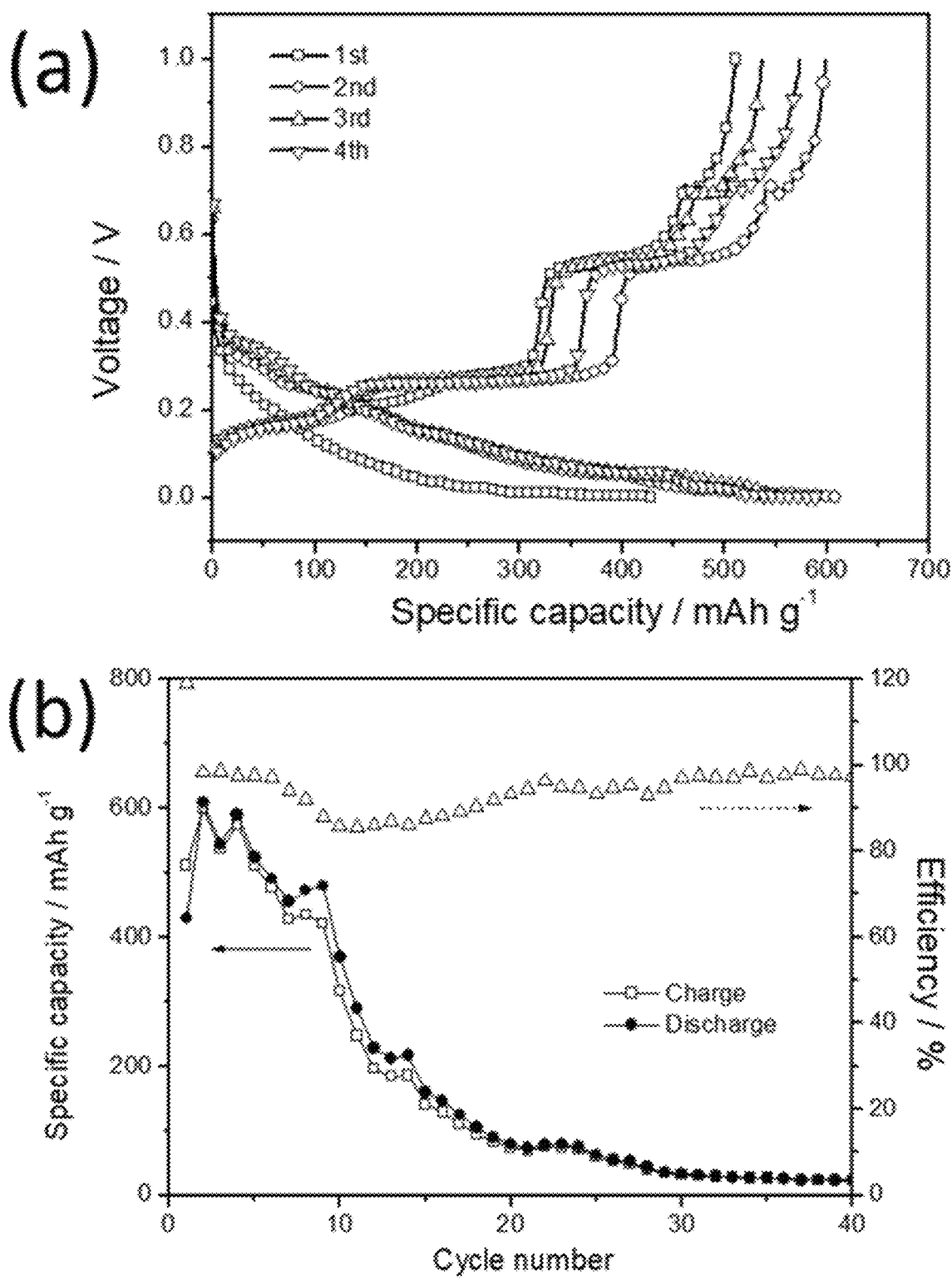
FIG. 1 shows the electrochemical performance of neat Sn electrodes discharge and charge cycled at (a) and (b) 0-1.0V and (c) and (d) 0-0.6V, showing fast capacity fading.
Figure 1:
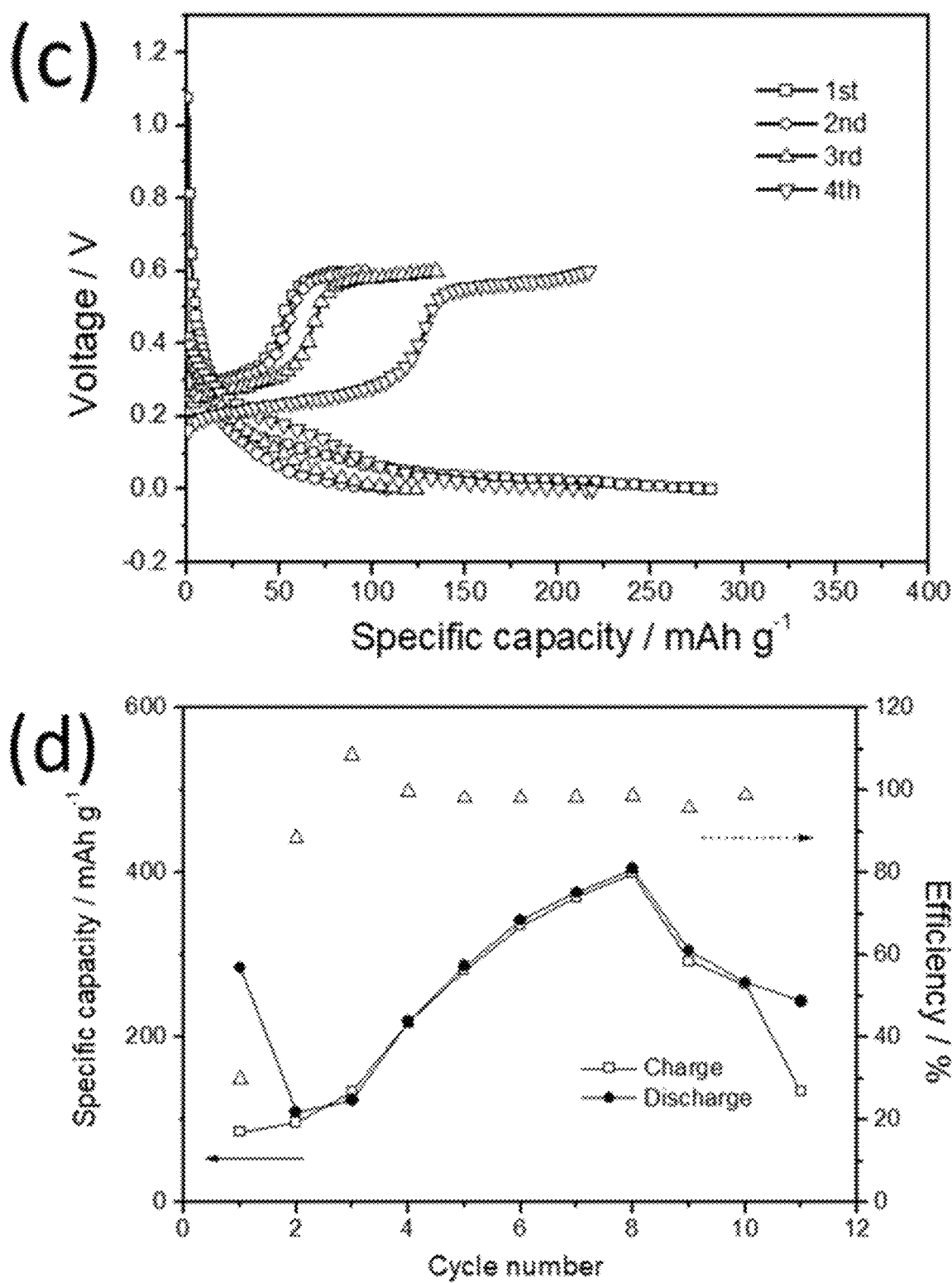
Figure 2:
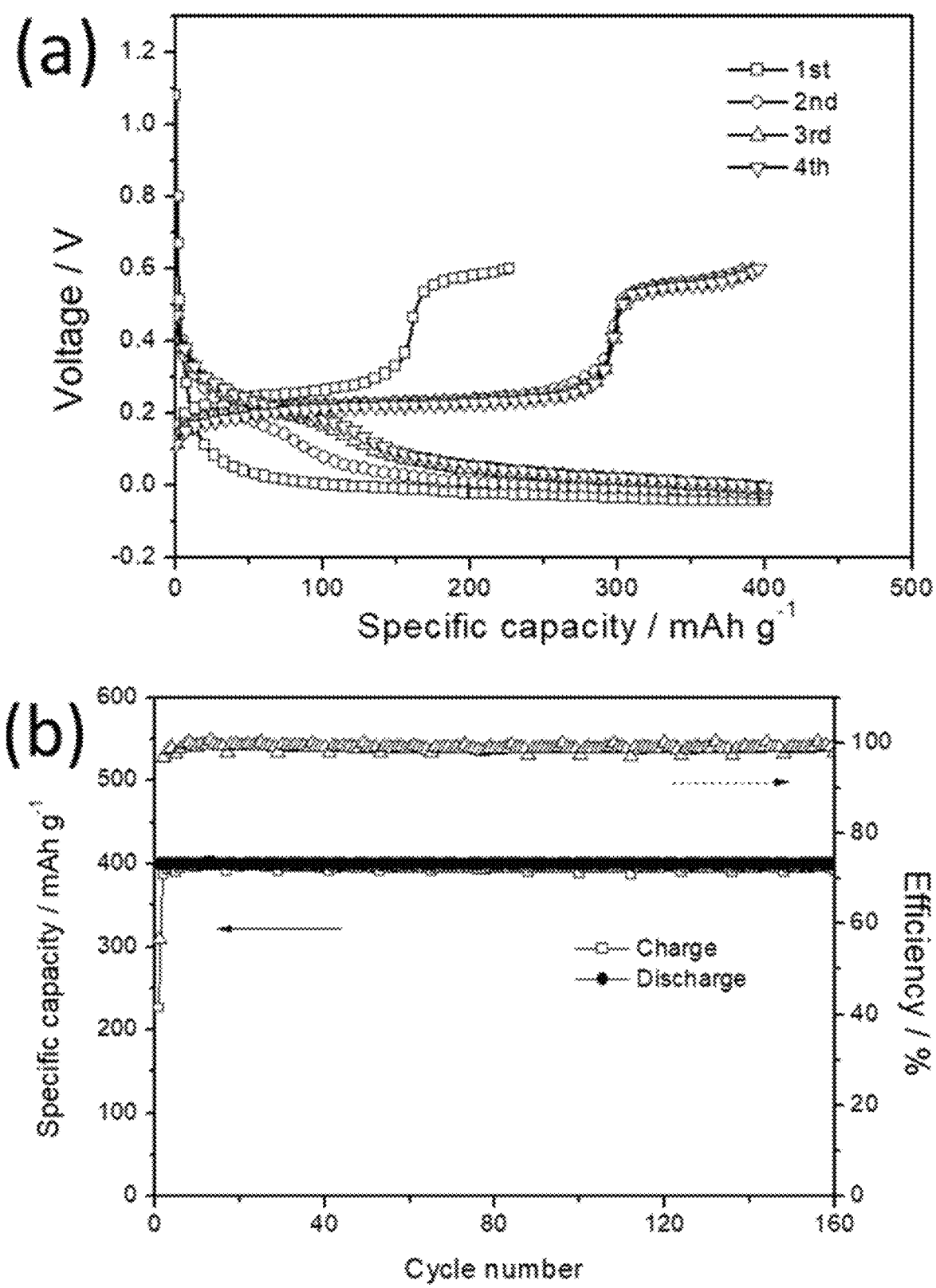
FIG. 2 shows (a) the electrochemical performance of Na/$Na_{3.75}$Sn mixed phase with a molar ratio of Na:$Na_{3.75}$Sn=~0.1:1; (b) the cyclic performance of Na/$Na_{3.75}$Sn mixed phase with a molar ratio of Na:$Na_{3.75}$Sn~0.1; (c) XRD pattern and (d) scanning electron microscopy (SEM) image of an Na/$Na_{3.75}$Sn (~0.1:1 molar ratio) electrode.
Figure 2:
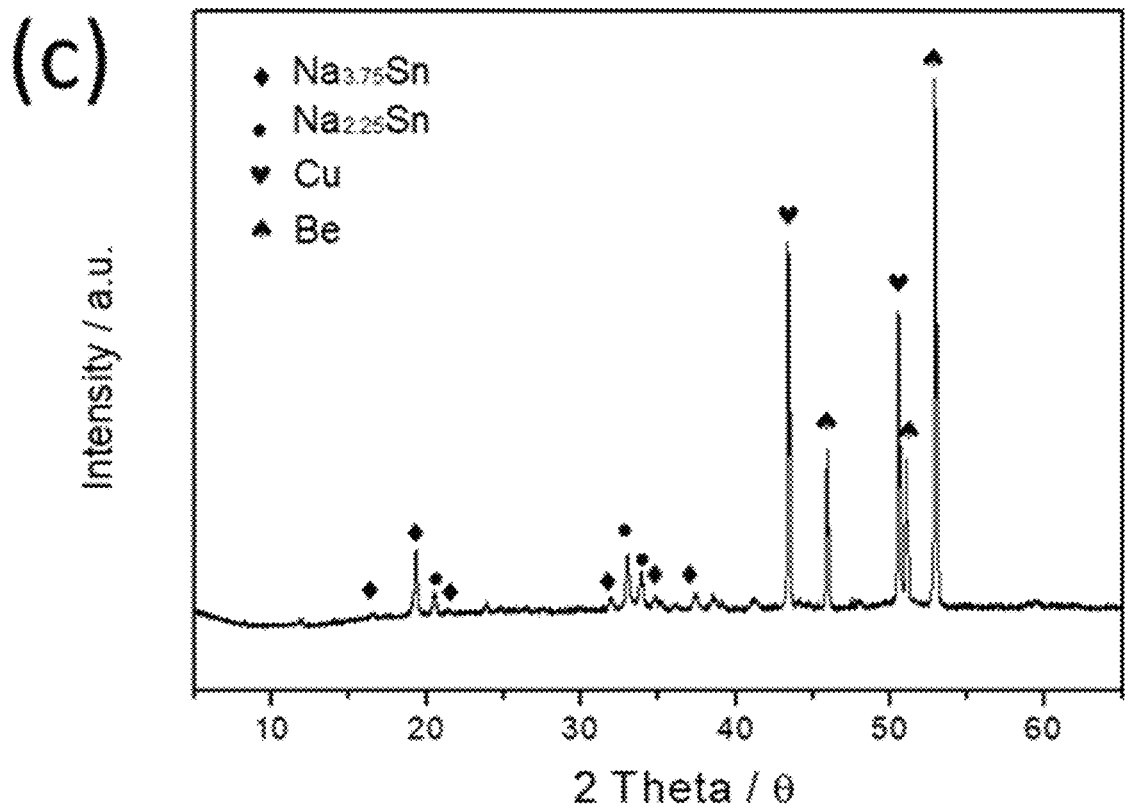
Figure 2:
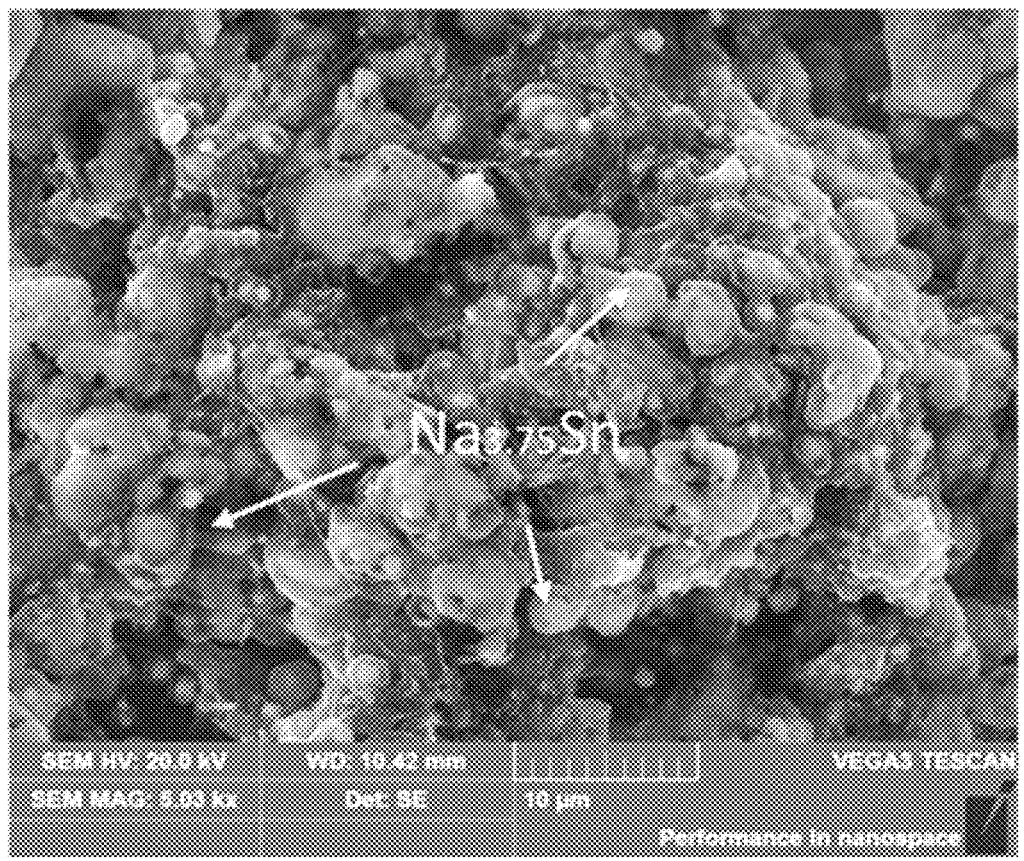
Figure 3:
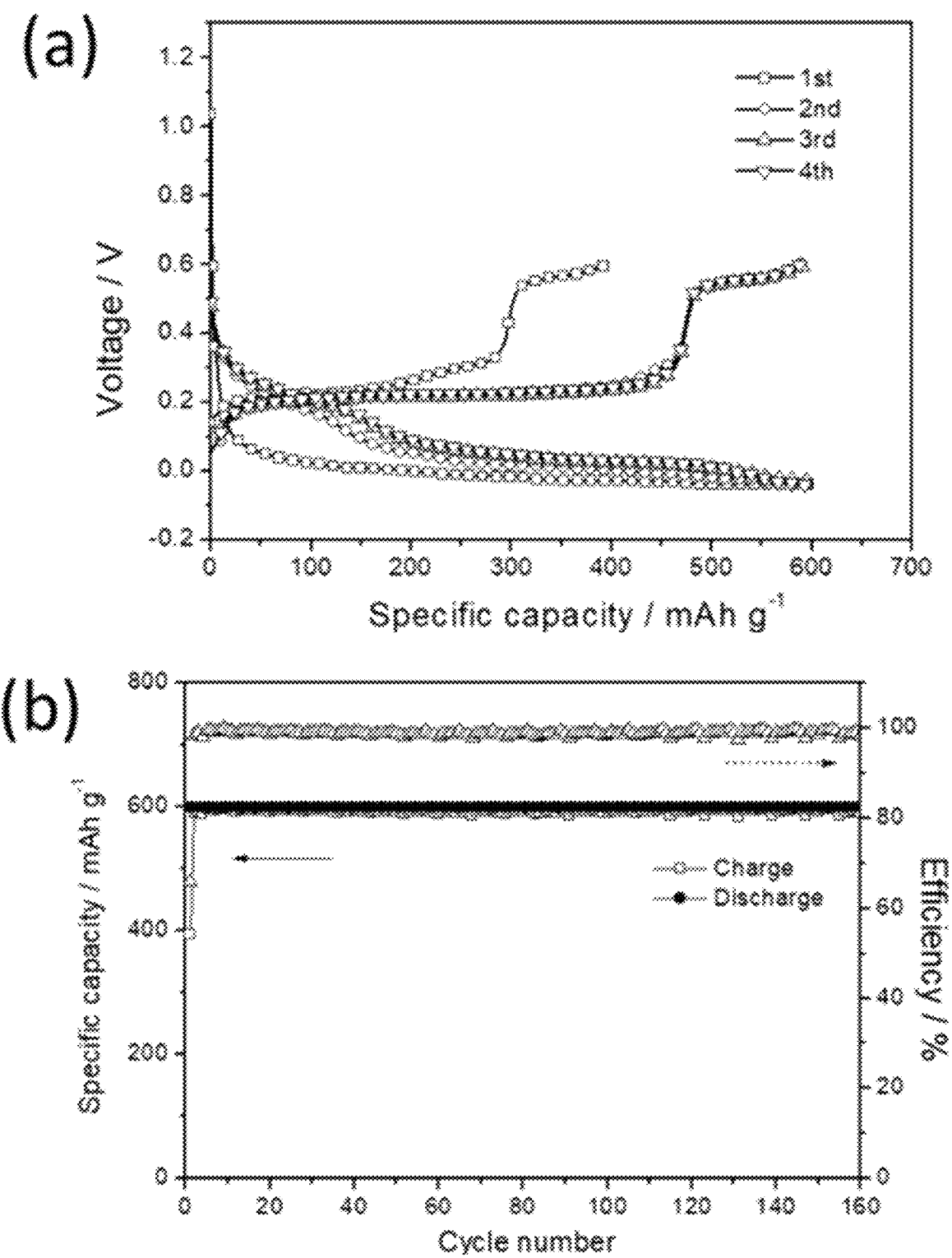
FIG. 3 shows (a) the electrochemical performance of Na/$Na_{3.75}$Sn mixed phase with the molar ratio of Na:$Na_{3.75}$Sn=0.22:1; (b) the cyclic performance of Na/$Na_{3.75}$Sn mixed phase with the molar ratio of Na:$Na_{3.75}$Sn=0.22:1; (c) XRD pattern and (d) SEM image of an Na/$Na_{3.75}$Sn (0.22:1 molar ratio) electrode.
Figure 3:
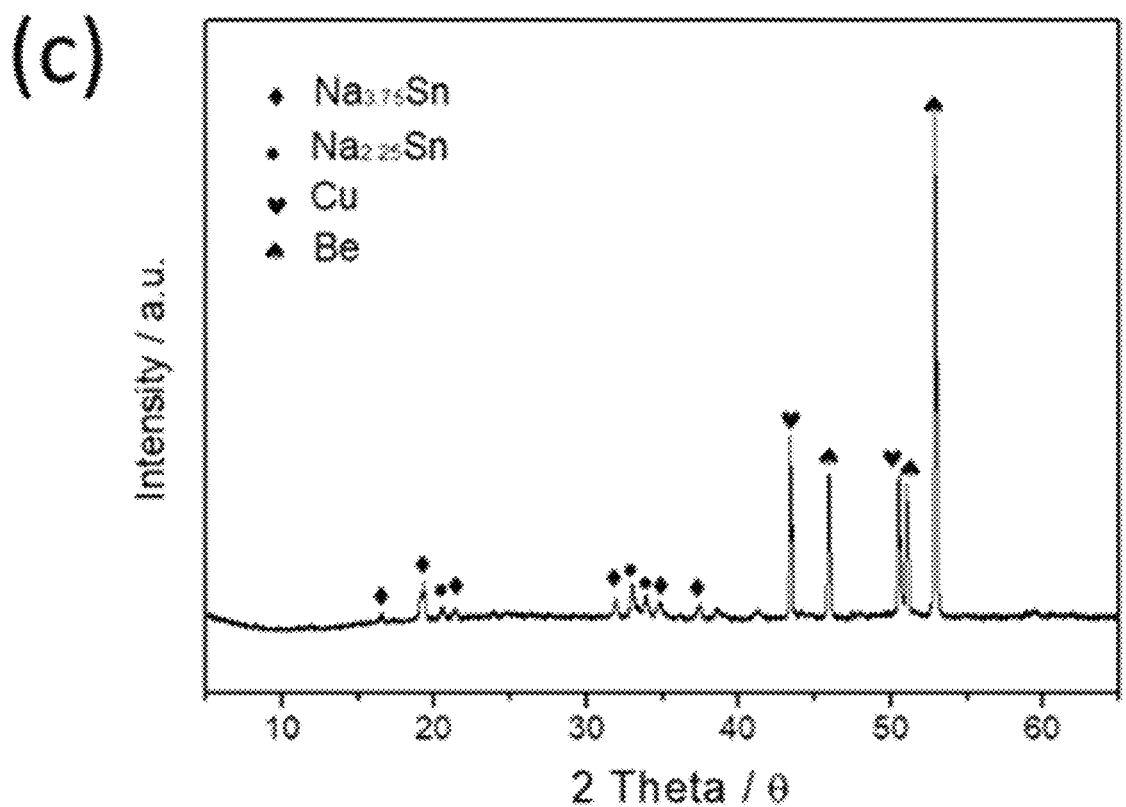
Figure 3:
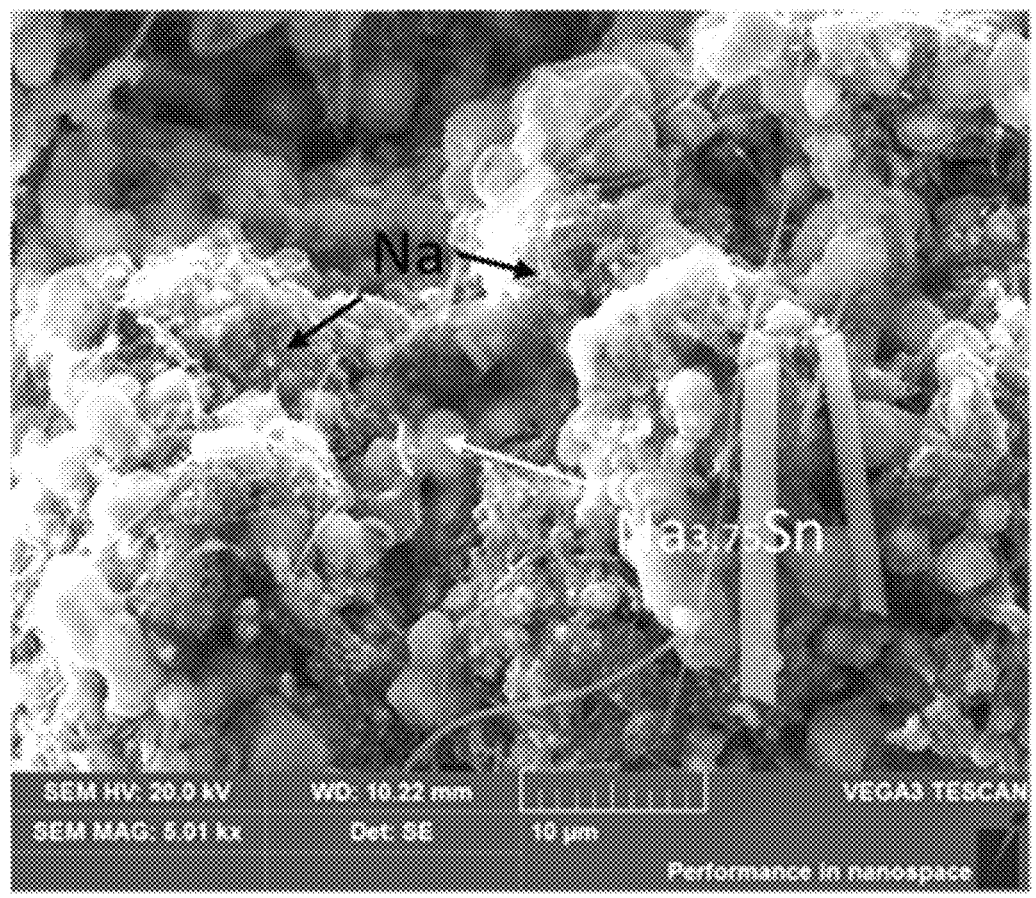
Figure 4:
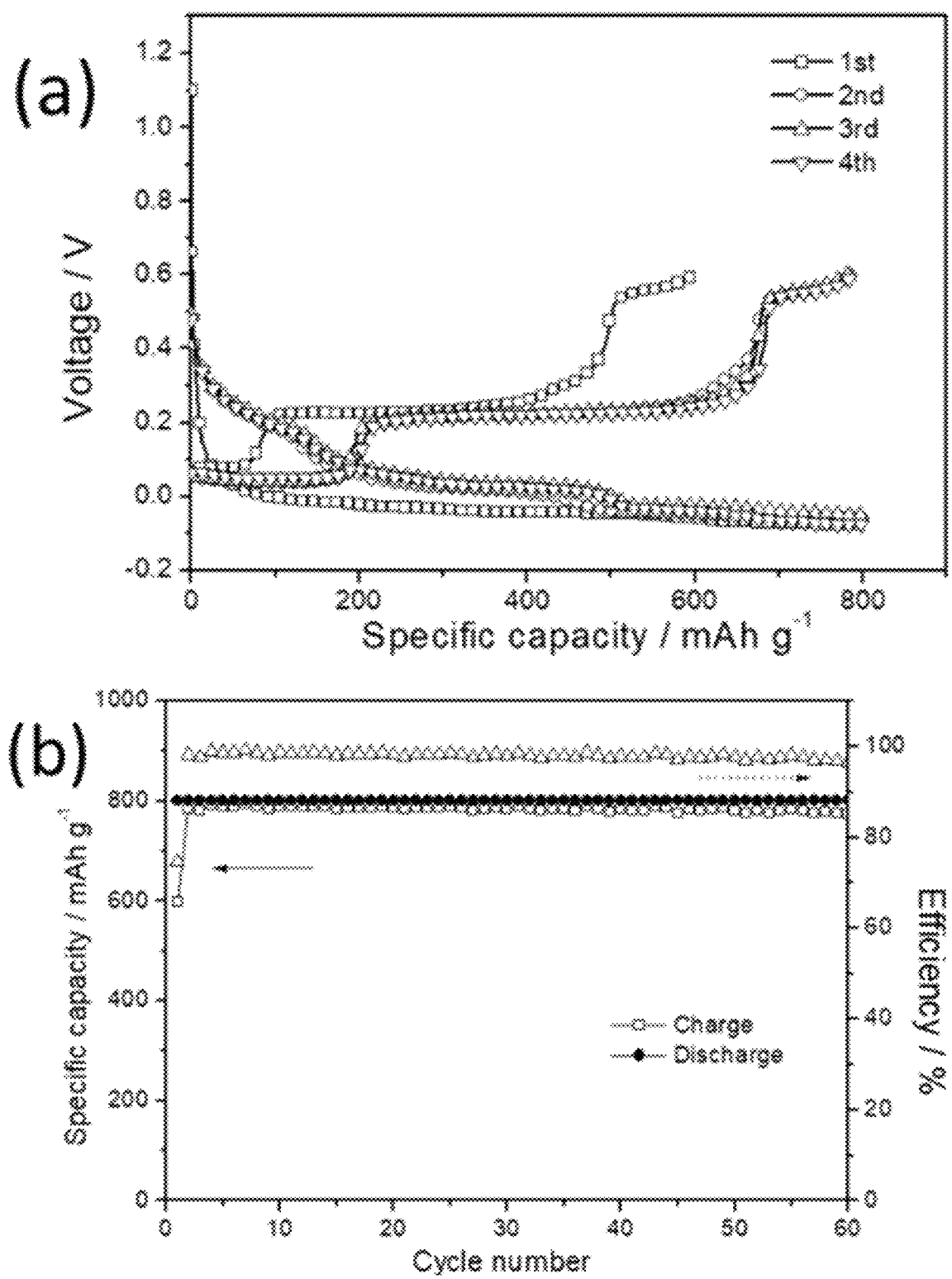
FIG. 4 shows (a) the electrochemical performance of Na/$Na_{3.75}$Sn mixed phase with the molar ratio of Na:$Na_{3.75}$Sn=1.0:1; (b) the cyclic performance Na/$Na_{3.75}$Sn mixed phase with the molar ratio of Na:$Na_{3.75}$Sn=1.0:1; (c) XRD pattern and (d) SEM image of an Na/$Na_{3.75}$Sn (1:1 molar ratio) electrode.
Figure 4:
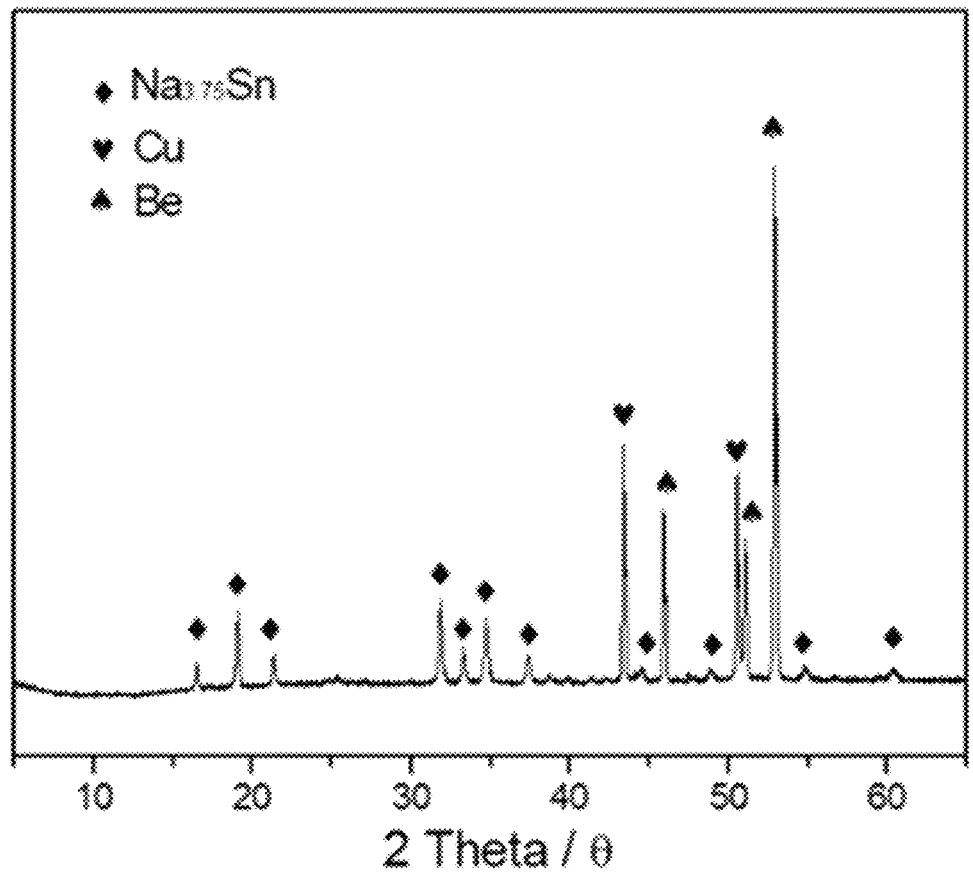
Figure 4:
Figure 5:
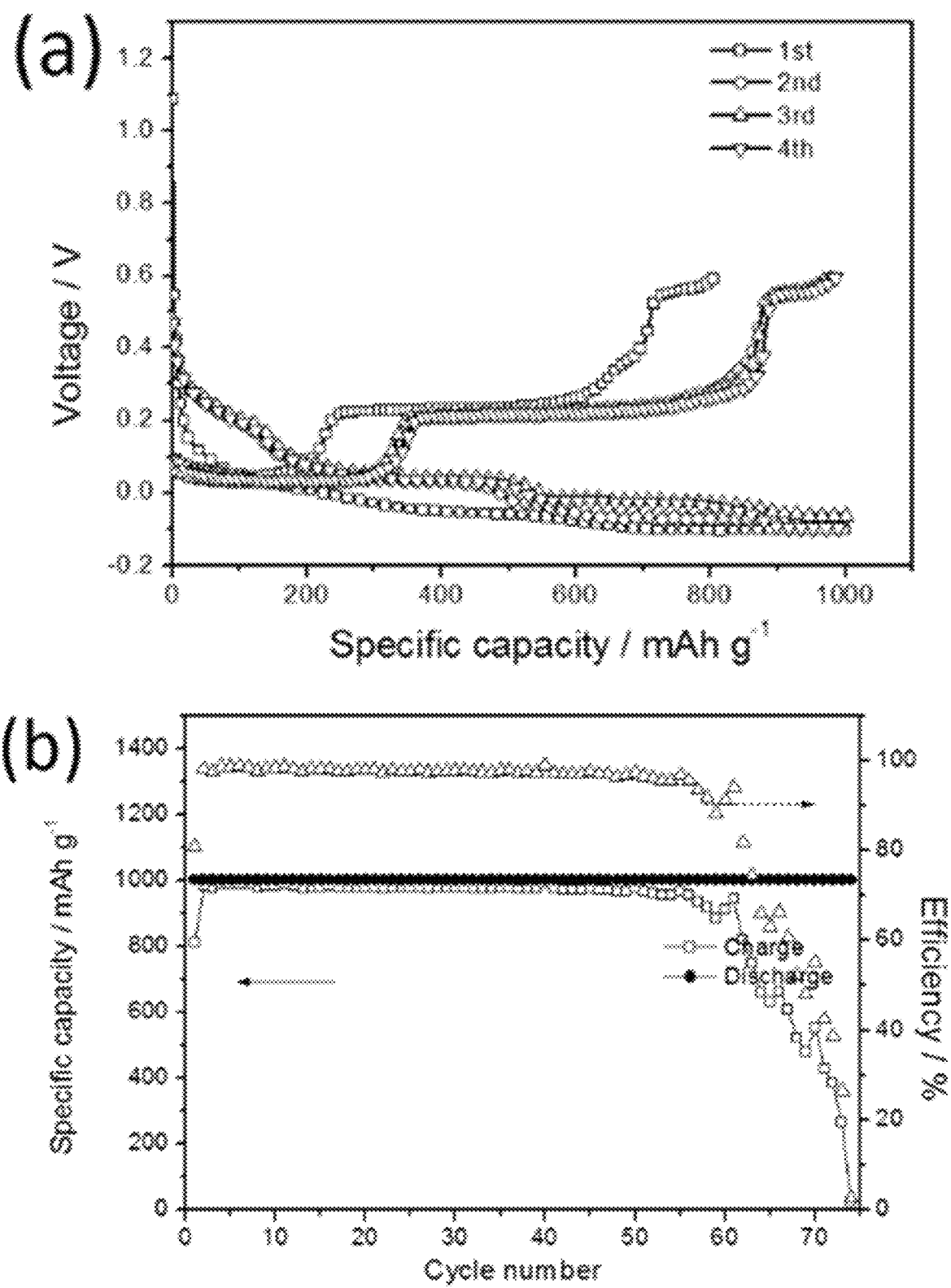
FIG. 5 shows (a) the electrochemical performance of Na/$Na_{3.75}$Sn mixed phase with the molar ratio of Na:$Na_{3.75}$Sn=1.7:1; (b) the cyclic performance Na/$Na_{3.75}$Sn mixed phase with the molar ratio of Na:$Na_{3.75}$Sn=1.7:1; (c) XRD pattern and (d) SEM image of an Na/$Na_{3.75}$Sn (1.7:1 molar ratio) electrode.
Figure 5:
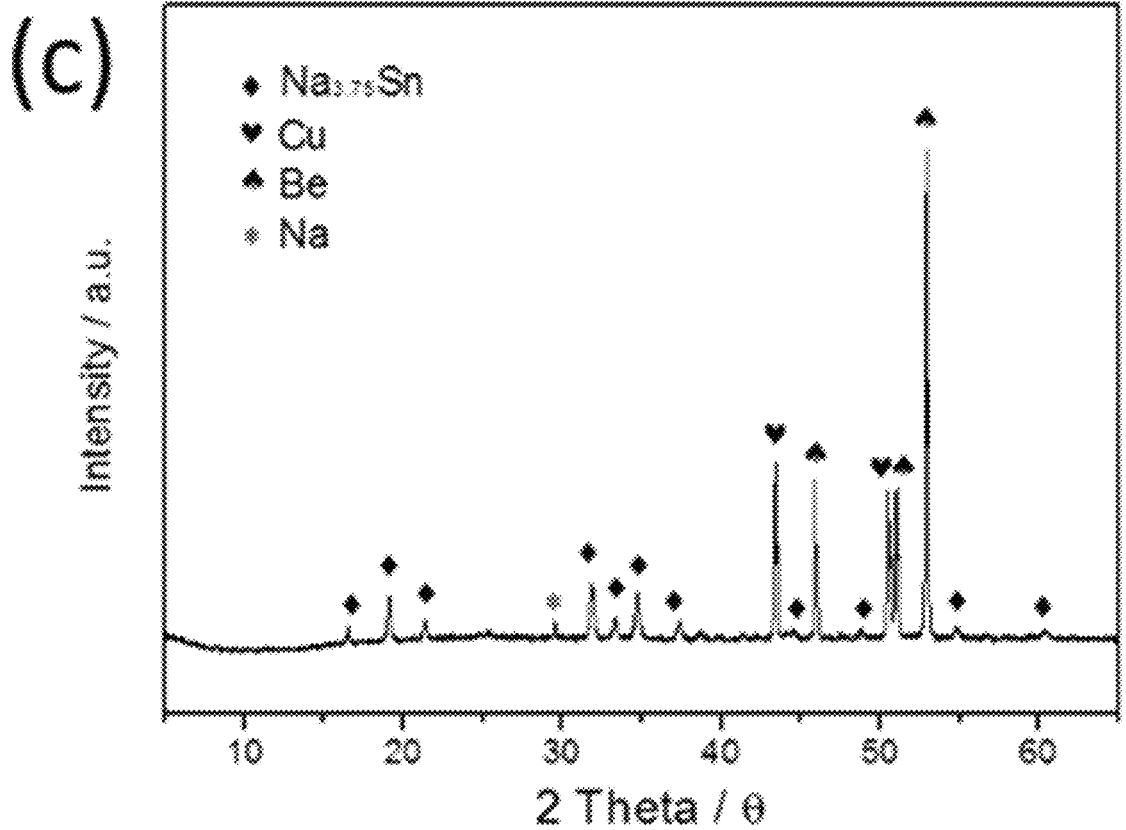
Figure 5:
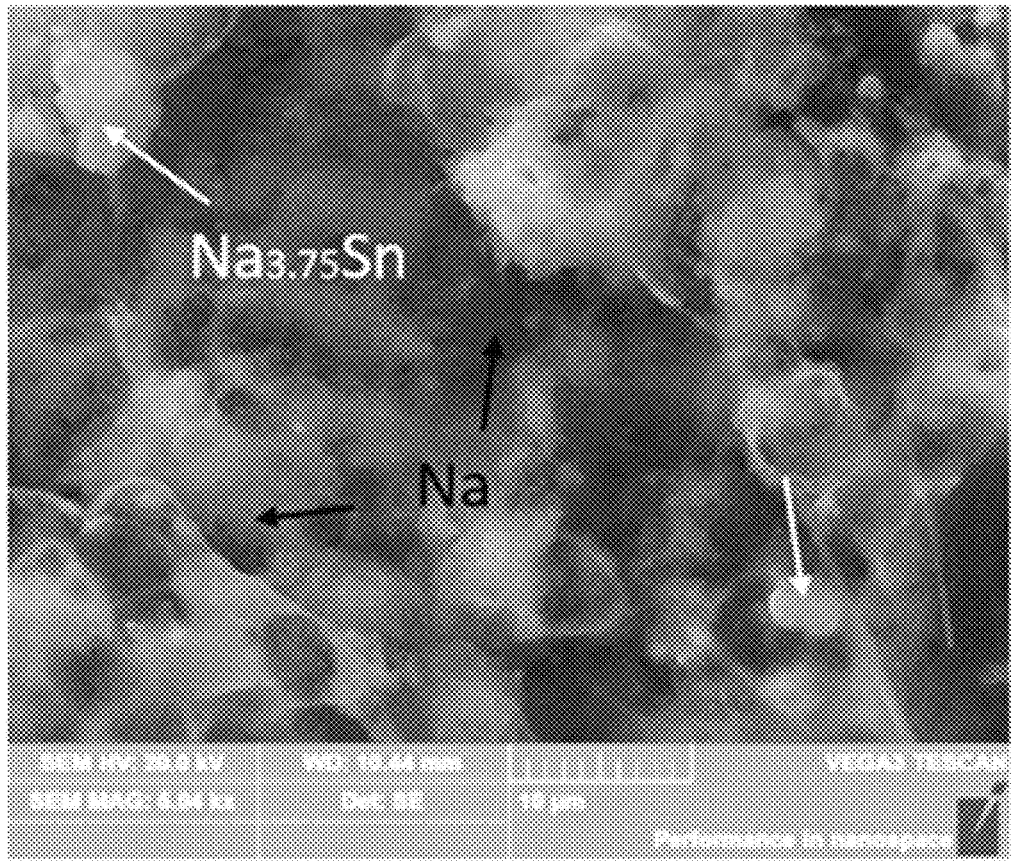
Figure 6:
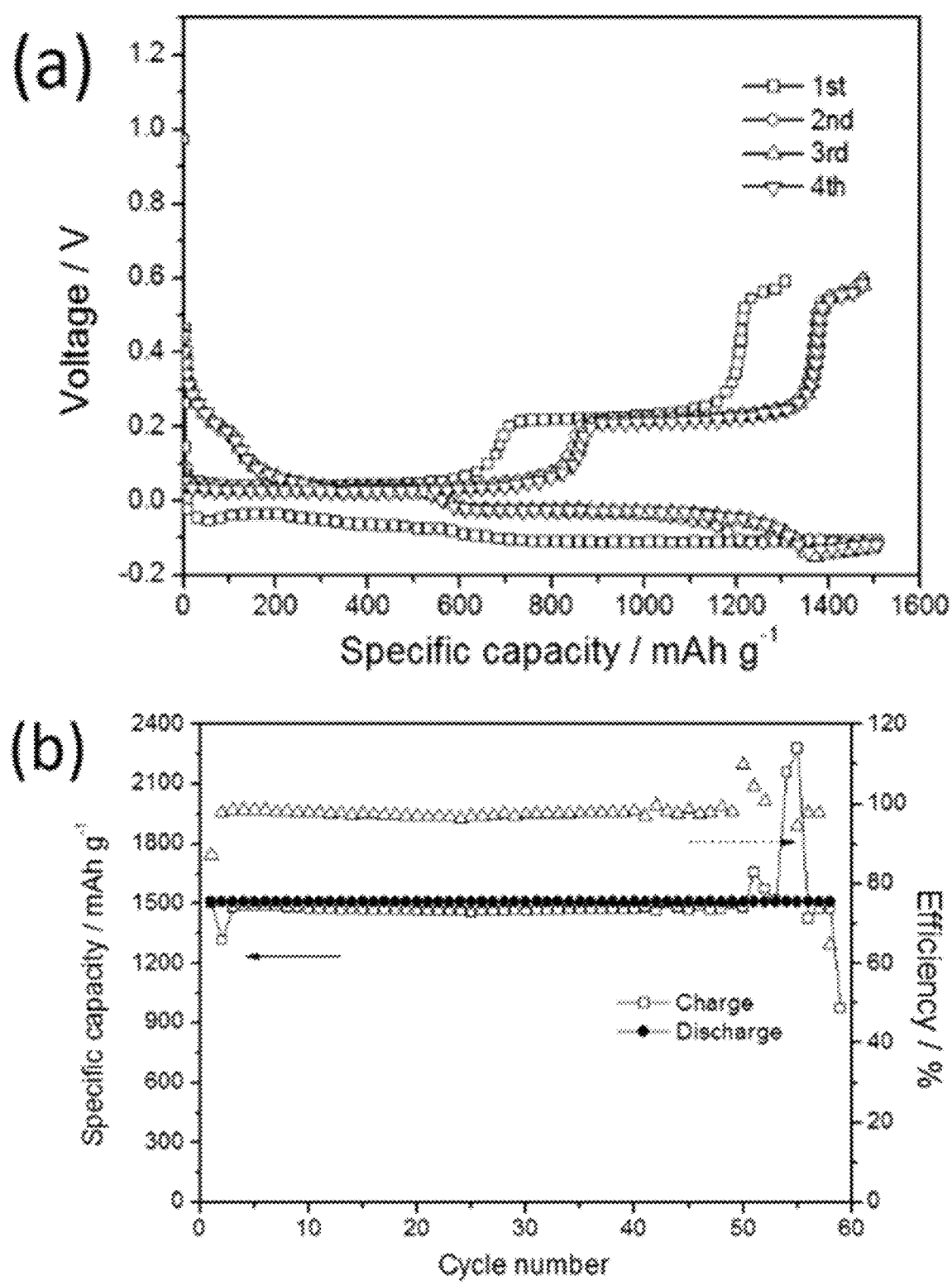
FIG. 6 shows (a) the electrochemical performance of Na/$Na_{3.75}$Sn mixed phase with the molar ratio of Na:$Na_{3.75}$Sn=4:1; (b) the cyclic performance Na/$Na_{3.75}$Sn mixed phase with the molar ratio of Na:$Na_{3.75}$Sn=4:1; (c) XRD pattern and (d) SEM image of an Na/$Na_{3.75}$Sn (4:1 molar ratio) electrode.
Figure 6:
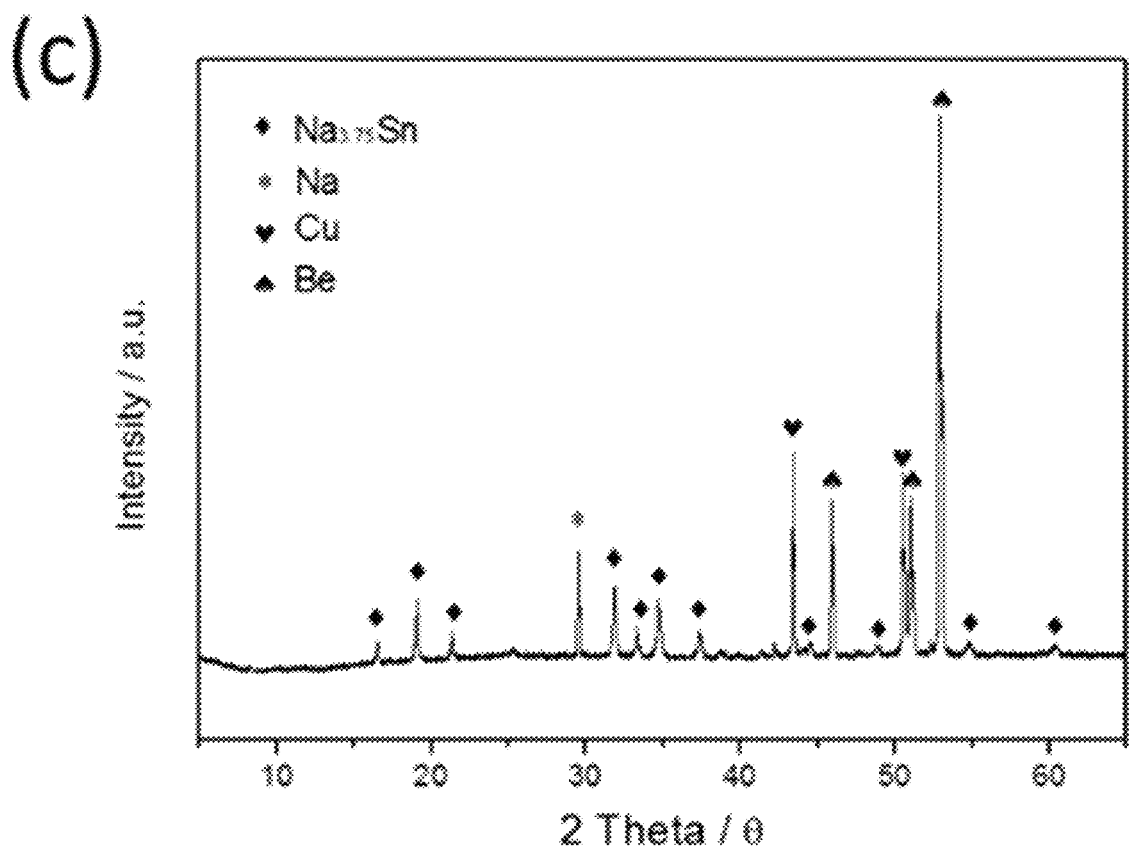
Figure 6:
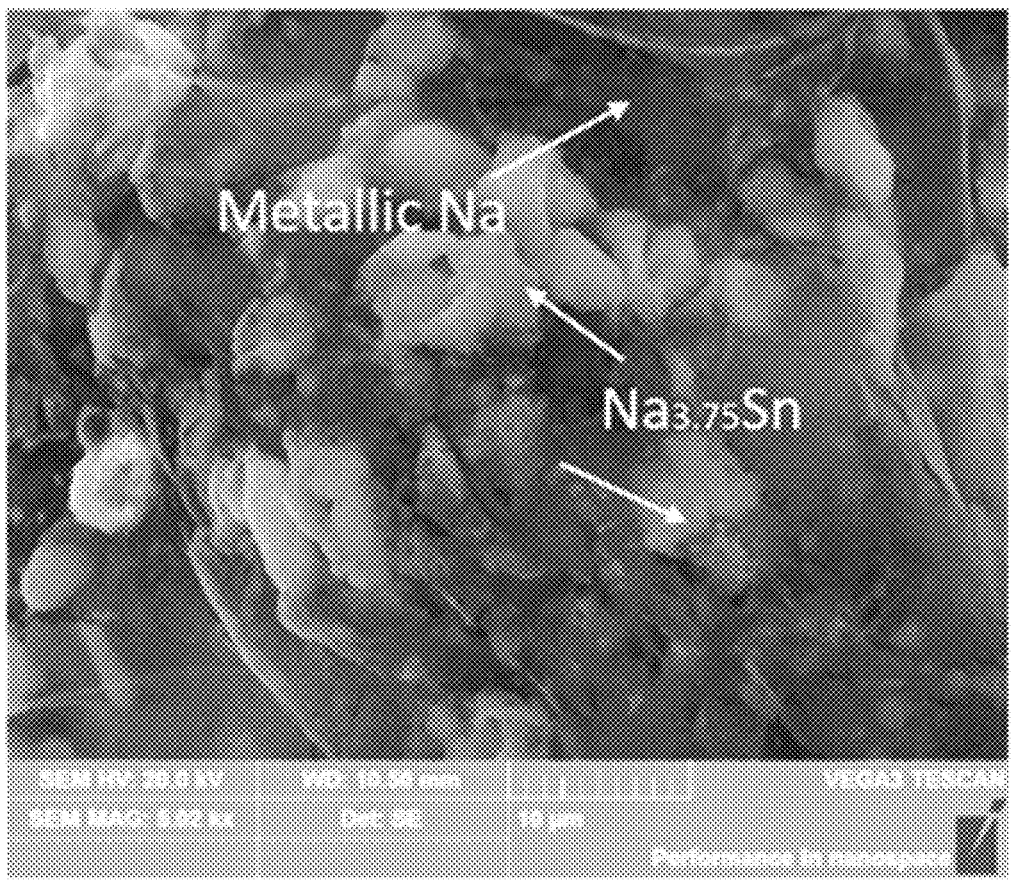
Figure 7:
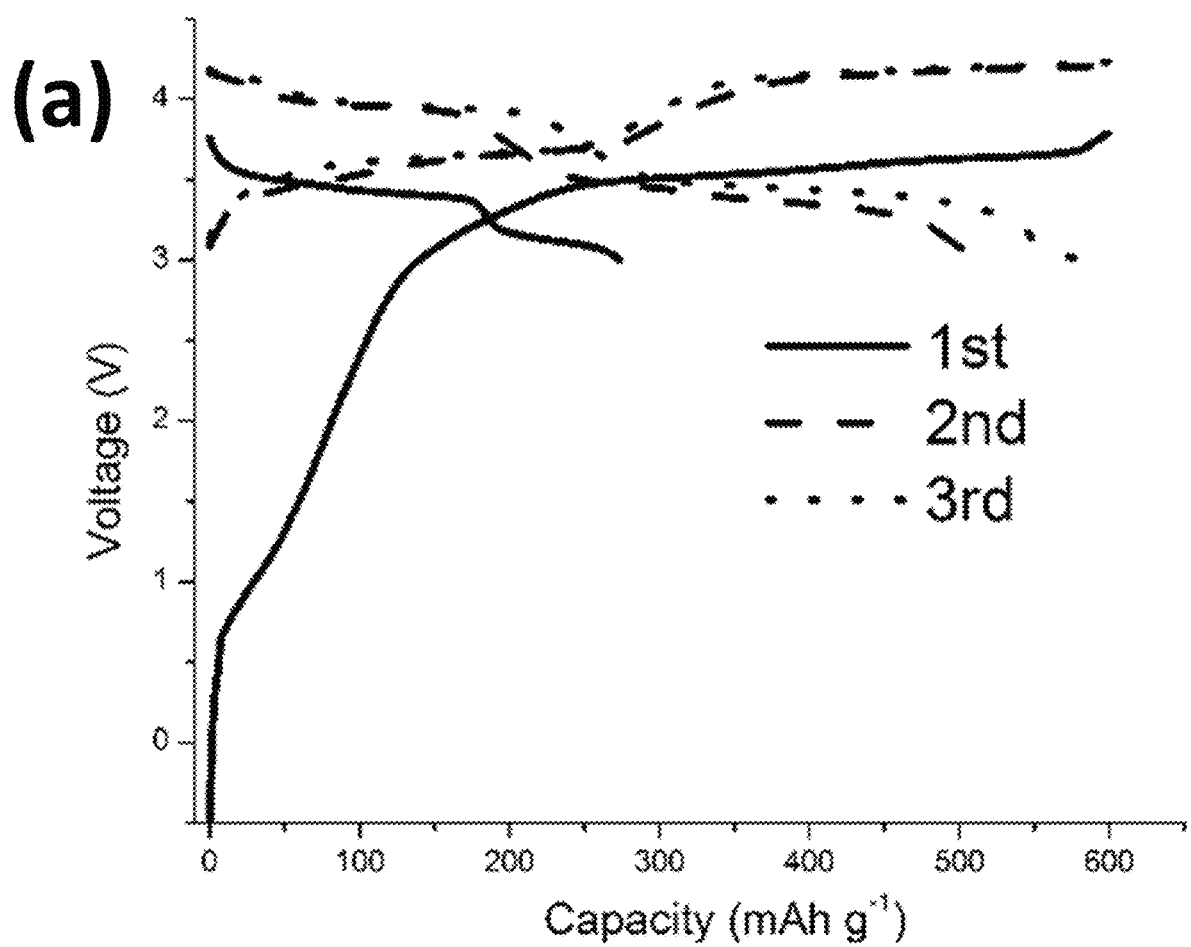
FIG. 7 shows (a) voltage profiles of a NVPF-Na/$Na_x$Sn full cell; and (b) cyclic performance of a NVPF-Na/$Na_x$Sn (0.22:1 molar ratio of Na:$Na_{3.75}$Sn) in comparison with NVPF-$Na_x$Sn.
Figure 7:
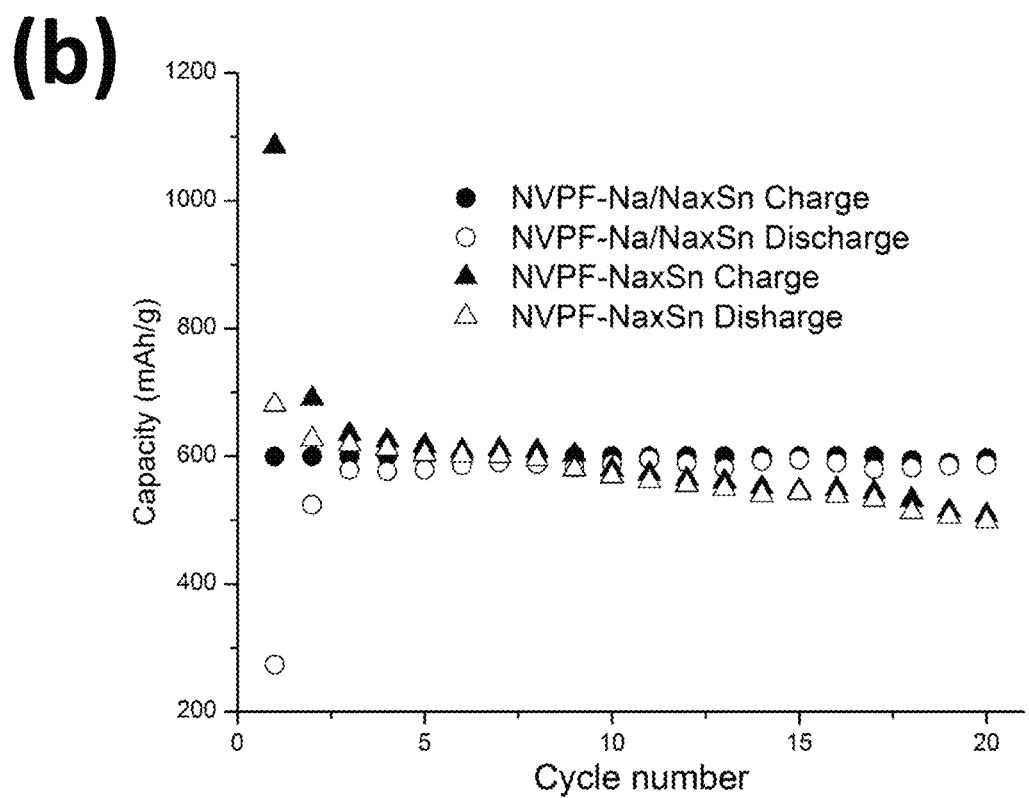

The following detailed description is provided to aid those skilled in the art in practicing the present invention. However, the following detailed description should not be construed to unduly limit the present invention. Variations and modifications in the embodiments discussed may be made by these of ordinary skill in the art without departing from the scope of the present inventive discovery.

Provided herein are electrode materials, which when incorporated into an electrode can exhibit high specific capacity (mAh/g) retention (i.e., improved cycle life). NIBs incorporating such electrodes can be cycled through multiple charge/discharge cycles with high capacity retention. For example, such electrodes can have a specific capacity of greater than 400 mAh/g, greater than 600 mAh/g, greater than 1000 mAh/g, or even greater than 1,500 mAh/g when the battery is cycled between −0.05V and 0.6 V or −5 mV and 1.2V vs. a sodium reference electrode and the temperature is maintained at about room temperature (25° C.) or at 30° C. or at 60° C. or even higher.

The electrode material can comprise metallic sodium and at least one sodium-tin binary alloy having the formula $Na_x$Sn, wherein X represents the molar ratio of Na to Sn in the at least one sodium-tin binary alloy and can range from 0.1-3.75. In certain embodiments, the at least one sodium-tin binary alloy is selected from the group consisting of: $Na_{0.2}$Sn, $Na_{0.33}$Sn, $Na_{0.50}$Sn, NaSn, $Na_{2.25}$Sn, $Na_{3.5}$Sn, and $Na_{3.75}$Sn, which can also be represented by the sodium-tin binary alloy chemical formulas $NaSn_5$, $NaSn_3$, $NaSn_2$, NaSn, $Na_9Sn_4$, $Na_7Sn_2$, and $Na_{15}Sn_4$, respectively. In certain embodiments, the at least one sodium-tin binary alloy is selected from the group consisting of: $Na_{0.20}$Sn, NaSn, $Na_{2.25}$Sn, and $Na_{3.75}$Sn. In certain embodiments, the at least one sodium-tin binary alloy is $Na_{3.75}$Sn or $Na_{3.75}$Sn and $Na_{2.25}$Sn.

The electrode material can be used in the fabrication of an anode.

The electrode material can comprise a greater amount by mass of the sodium-tin binary alloy than the mass of metallic sodium. In certain embodiments, the sodium-tin binary alloy represents 51-99.9% (m/m) of combined mass of sodium-tin binary alloy and metallic sodium. In certain embodiments, the sodium-tin binary alloy represents 55-99.9%; 55-99%; 60-99%; 65-99%; 68-99%; 73-99%; 78-99%; 83-99%; 88-99%; 90-99%; 91-99%; 92-99%; 93-99%; 94-99%; 95-99%; 96-99%; or 97-99% (m/m) of the combined mass of sodium-tin binary alloy and metallic sodium.

In certain embodiments, the metallic sodium represents 0.1-49% (m/m) of the combined mass of the sodium-tin binary alloy and metallic sodium. In certain embodiments, the metallic sodium represents 0.1-45%; 1-45%; 1-40%; 1-35%; 1-32%; 1-27%; 1-22%; 1-17%; 1-12%; 1-10%; 1-9%-8%; 1-7%; 1-6%; 1-5%; 1-4%; or 1-3% (m/m) of the combined mass of sodium-tin binary alloy and metallic sodium.

The metallic sodium can be in crystalline form, amorphous form, or a combination thereof. In certain embodiments, the electrode material comprises substantially no crystalline metallic sodium. In certain embodiments, the electrode material comprises amorphous metallic sodium.

The electrode material can comprise the metallic sodium to the at least one sodium-tin binary alloy in a molar ratio between 0.001:1 to 5:1. In certain embodiments, the molar ratio of the metallic sodium to the at least one sodium-tin binary alloy is between 0.01:1 to 4.5:1; 0.05:1 to 4.5:1; 0.05:1 to 4.2:1; 0.05:1 to 4.0:1; 0.05:1 to 3.5:0:1;*0.05:1 to 3.0:1; 0.05:1 to 2.5:1; 0.05:1 to 2.0:1; 0.05:1 to 1.5:1; 0.05:1 to 1.0:1; 0.05:1 to 0.9:1; 0.05:1 to 0.8:1; 0.05:1 to 0.7:1; 0.05:1 to 0.6:1; 0.05:1 to 0.5:1; 0.05:1 to 0.4:1; 0.05:1 to 0.3:1; 0.05:1 to 0.25:1; 0.05:1 to 0.22:1; 0.1:1 to 0.25:1; or 0.1:1 to 0.22:1. In certain embodiments, the molar ratio of the metallic sodium to the at least one sodium-tin binary alloy is $0<Y\leq0.25$ to 1; $0.01<Y\leq0.25$ to 1; $0<Y\leq0.22$ to 1; $0.01<Y\leq0.22$; $0.05<Y\leq0.22$ to 1; $0.07<Y\leq0.22$; or $0.09<Y\leq0.22$, wherein Y is the molar ratio of metallic sodium.

The electrode material can comprise heterogeneous mixture of particles of the at least one sodium-tin binary alloy and particles of metallic sodium and/or a thin film of metallic sodium. The particles of metallic sodium and/or a thin film of metallic sodium can be attached to the surface of the particles of the at least one sodium-tin binary alloy and/or thereamong the particles of the at least one sodium-tin binary alloy.

The particle size of the at least one sodium-tin binary alloy can be any size, but generally ranges from 1 nm to 100 µm. In certain embodiments, the particle size of the at least one sodium-tin binary alloy can range from 10 nm to 100 µm; 100 nm to 100 µm; 100 nm to 80 µm; 100 nm to 60 µm; 100 nm to 40 µm; 100 nm to 20 µm; 100 nm to 100 µm; 500 nm to 100 m; 1 µm to 100 µm; 1 µm to 50 µm; 1 µm to 20 µm; or 1 µm to 10 µm. The particles of the at least one sodium-tin binary alloy can agglomerate forming larger particles.

Also provided herein is an electrode comprising the electrode material described herein. The electrode can be an anode. In certain embodiments, the electrode comprises the electrode material described herein, at least one conductive carbon material, and at least one electrode binder.

The at least one conductive carbon material can be natural graphite, artificial graphite, mesocarbon micro-bead (MCMB), graphitic coke, mesoporous carbon, hard carbon, soft carbon (e.g., carbon black), crystalline carbon, Super P, carbon fiber, amorphous carbon, carbon or graphite fiber segments, carbon nanofiber or graphitic nanofiber, carbon nanotube, graphene, graphene oxide or a combination thereof.

At least one electrode binder can be added to increase the mechanical integrity of the electrode, to improve mechanical and electrical contact at the solid-solid interface and/or the solid/liquid interface, to increase electronic and/or ionic conduction throughout the electrode, and to enhance the electrochemical redox reactions. Examples of suitable binders include, but are not limited to, poly(vinylacetate), polyvinylalcohol, polyethylene oxide, polyvinyl pyrrolidone, alkylated polyethylene oxide, cross linked polyethylene oxide, polyvinyl ether, poly(methyl methacrylate), polyacrylic latexes (such as, LA132 and LA133) polyvinylidene fluoride, copolymer of polyhexafluoropropylene and polyvinylidene fluoride, poly(ethyl acrylate), polytetrafluoroethylene, polyvinyl chloride, polyacrylonitrile, polyvinylpyridine, polystyrene, carboxymethylcellulose, sodium carboxymethylcellulose, styrene-butadiene rubber, derivatives thereof, blends thereof, and copolymers thereof.

Electrodes comprising the electrode material described herein can be prepared by sodiating a Sn electrode. The Sn electrode can be prepared by forming a Sn electrode mixture comprising Sn particles, at least one conductive carbon material, at least one electrode binder, and optionally an electrode solvent.

The Sn particles can have an average particle size ranging between 100 nm and 10 µm. In certain embodiments, the average size of the Sn particles is between 100 nm and 5 µm, 100 nm and 2 µm, or 1 µm and 2 µm.

The Sn electrode mixture can be prepared neat, i.e., without the use of an electrode solvent, or as a slurry in an electrode solvent. In instances where an electrode solvent is used, any solvent can be used. Exemplary solvents include, water, alcohols, ethers, esters, ketones, hydrocarbons, aromatics, haloalkanes, and combinations thereof. In certain embodiments, the solvent is water.

The method for preparing the Sn electrode can further comprise the step of ball milling the Sn particles, at least one conductive carbon material, the at least one electrode binder, of mixtures thereof prior to their combination or after their combination. In certain embodiments, the method further comprises ball milling a mixture of Sn particles, at least one conductive carbon material, and at least one binder thereby forming a ball milled mixture having an average particle size of ranging from 100 nm to 10 µm.

The Sn electrode mixture can then be applied on to a current collector a (e.g., anode current collector) and if an electrode solvent is present, the electrode solvent can be removed under reduced pressure and/or heat.

The Sn electrode is then sodiated thereby forming the electrode material described herein. Any method known in the art can be used to sodiate the Sn electrode. The selection of a suitable method for conducting the sodiation is well within the skill of a person of ordinary skill in the art. In certain embodiments, the method for sodiating the Sn electrode comprises the steps of: providing a cell comprising the Sn electrode; a counter electrode which can provide Na+; and an electrolyte comprising Na; and discharging the cell to below 0 volts versus a Na/N reference electrode thereby forming the electrode material described herein.

In instances in which the Sn electrode is configured as the anode (negative electrode) in a full cell where a typical cathode, such as $Na_3V_2(PO_4)_2F_3$ (positive electrode) is adopted, the cell can be charged thereby forming the electrode material described herein.

In instances in which the Sn electrode is configured as the cathode in the cell, the cell can be discharged thereby forming the electrode material described herein. In the examples below, the Sn electrode is sodiated by discharging a cell comprising a sodium metal counter electrode and the Sn electrode is used as the working electrode.

The cell can be charged or discharged at a capacity of 1,600 mAh $g^{-1}$ of Sn in the Sn electrode. In certain embodiments, the cell is charged or discharged at a capacity of less than or equal to 1,500, 1,400, 1,300, 1,200, 1,100, 1,000, 900, 800, 700, 600, 500, or 400 mAh $g^{-1}$ of the Sn in the Sn electrode. In certain embodiments, the cell is charged or discharged at a capacity of 400 to 1,600, 400 to 1,500, 400 to 1,400, 400 to 1,300, 400 to 1,200, 400 to 1,100, 400 to 1,000, 400 to 900, or 400 to 800 mAh $g^{-1}$ of Sn in the Sn electrode.

Also provided are sodium batteries comprising the electrode material described herein. A typical sodium battery includes an anode; a cathode; electrolyte, in which ions move between the anode and cathode in the electrolyte; and a separator substrate between cathode and anode to block passage of electrons (to prevent short circuiting). The active ions move from the anode to the cathode during discharge and from the cathode to the anode when charging.

Current collectors, which are normally made of metal, are used during discharge to conduct electrons away from the anode, through an external circuit, and then to the cathode. During charging, current collectors conduct electrons to the anode from the cathode. Current collectors may be made from any suitably conductive material, such as (but not limited to) aluminum, copper, nickel, or gold.

In certain embodiments, the electrolyte is a liquid electrolyte. Liquid electrolytes generally include an electrolyte solvent and at least one sodium salt (one or more sodium cation plus one or more anions).

The liquid electrolyte can comprise at least one sodium salt selected from the group consisting of $NaCO_4$, $NaNO_3$, $NaBF_4$, $NaPF_6$, $NaCF_3SO_3$, $NaCF_3CO_2$, $NaAsF_6$, $NaSbF_6$, $NaACl_4$, NaCl, NaBr, NaI, sodium bisoxalatoborate, sodium oxalyldifluoroborate, and sodium bis(trifluoromethanesulfonyl)imide.

The liquid electrolyte can comprise at least one electrolyte solvent selected from propylene carbonate, ethylene carbonate, butylene carbonate, dimethyl carbonate, diethyl carbonate, methyl ethyl carbonate, 7-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl-ether, 1,3-propanesultone, N-methyl acetamide, acetonitrile, acetals, ketals, sulfones, sulfolanes, aliphatic ethers, cyclic ethers, glymes, polyethers, phosphate esters, siloxanes, dioxolanes, and N-alkylpyrrolidones. In certain embodiments, the liquid electrolyte comprises propylene carbonate, fluoroethylene carbonate, and combinations thereof.

In some embodiments, the separator substrate is selected from polyolefin, fluorine-containing polymers, cellulose polymers, polyimides, nylons, glass fibers, alumina fibers, porous metal foils, and combinations thereof.

The separator substrate can be made from a polyolefin. Exemplary polyolefins include; but are not limited to, polyethylene (PE), ultra-high molecular weight polyethylene (UHMWPE), polypropylene (PP), polymethylpentene (PMP), polybutylene, copolymers of any of the foregoing, and mixtures thereof. In certain embodiments, the separator substrate is a polyolefin, such as polyethylene, polypropylene, polybutylene, or combinations thereof (e.g., Celgard® separators, Celgard LLC, Charlotte, N.C., US). The separator substrate can be made by either a dry stretch process (also known as the CELGARD® process) or a solvent process (also known as the gel extrusion or phase separation process).

The electrode materials described herein can be used in the preparation of an anode (used as anode material). In instances in which the electrode materials described herein are used to prepare the anode, the anode material may further comprise one or more materials selected from the group consisting of at least one conductive carbon material, at least one electrode binder and an electrolyte. The at least one conductive carbon material, at least one electrode binder and electrolyte are as defined herein.

Examples of the cathode materials include spinel type active materials, layered oxide active materials, polyanion active materials, olivine type active materials and Prussian blue type active materials. Specific examples of the cathode active material include $Na_3MnPO_4CO_3$, $Na_xCoO_2$, $NaFePO_4$, $NaMnPO_4$, $NaCoPO_4$, $NaNiPO_4$, $NaCoO_2$, $NaMnO_2$, $NaVO_2$, $Na(NiXMn_{1-x})O_2(0<X<1)$, $Na(FeMn_{1-x})O_2(0<X<1)$, $Na_2Fe_2(SO_4)_3$, $NaVPO_4F$, $Na_2FePO_4F$, $Na_3V_2(PO_4)_3$, $Na_{0.67}(FeMn)_{0.5}O_2$, $Na_{1.92}Fe[Fe(CN)_6]$, and $Na_3V_2(PO_4)_2F_3$.

The cathode may further comprise one or more materials selected from the group consisting of at least one conductive carbon material, at least one electrode binder and an electrolyte. The at least one conductive carbon material, at least one electrode binder and electrolyte are as defined herein.

To evaluate the contribution of electrode materials described herein, the electrochemical performance of sodium batteries comprising the electrode material in the preparation of an anode was tested at the voltage range at −0.1-0.6 V with capacity limitation. FIGS. 2-6 show the discharge/charge profile of NIBs comprising anodes comprising varying molar ratios of metallic sodium to sodium-tin binary alloy.

EXAMPLES

Example 1: Preparation of Na/$Na_x$Sn (~0.1:1 Molar Ratio, x≤3.75) Electrode Material Preparation of Neat Sn Microparticle Electrode Sn (Sigma, ~10 μm, 99%) was mixed with Super P, carbon fiber, and carboxymethylcellulose sodium (Sigma-Aldrich, average Mw~700,000) in a weight ratio of 7:1:1:1 by ball-milling for 0.5 hour in an argon atmosphere at a speed of 360 r min$^{-1}$. The tap density of the as-milled powder is measured as 1.3 mg cm$^{-3}$. The as-prepared powder was further stirred in de-ionized water and then coated on copper foil to make the electrode tap.

(2) Preparation of Neat $Na_{3.75}$Sn Material (Substantially No Metallic Sodium) and its Performance.

The coin cells were assembled in an argon-filled glovebox with sodium metal as the reference/counter electrode, glass fiber (Whatman, GF/D) as the separator and the neat Sn electrode as the cathode. 65 μL of electrolytes consisting of 1M $NaPF_6$ in propylene carbonate (PC) with 5% fluoroethylene carbonate (FEC) additives were used for each coin cell. The electrochemical behaviors of as-assembled coin cells were measured with voltage windows of 0-1.0V and 0-0.6V on LAND battery testers. Both cells showed fast capacity degradations, as shown in FIG. 1.

(3) Preparation of Na/$Na_x$Sn (~0.1:1 Molar Ratio) Material

The coin cells were assembled according to step (2). An electrochemical Na plating is used to synthesize Na/$Na_x$Sn mixed phases. Here, the capacity limitation is used instead of voltage cut-off. A capacity limitation of 400 mAh g during discharge was adopted to control the metallic Na plating amount. A cut-off voltage of 0.6 V is used during charge. Na/$Na_{3.7}$Sn mixed phases having a molar ratio of about 0.1:1 were obtained at the discharge state.

(4) Electrochemical Performances

The cell was discharge and charge cycled at a current density of 400 mA g$^{-1}$. The capacity was calculated based on the weight of Sn. The discharge and charge curves in the first four cycles and the cyclic performance are reported in FIGS. 2a and 2b.

These results show there is a large irreversible capacity and a low coulombic efficiency of 56.6% in the first cycle, attributed to the formation of the solid electrolyte interlayer (SEI). The discharge plateaus at ~0.2 and ~0.1 V correspond to the formation of $Na_{2.25}$Sn and $Na_{3.75}$Sn, respectively. Metallic Na grows at the voltage below 0V. Stable cyclic behaviors were obtained during 160 cycles and coulombic efficiencies all reached more than 98%.

(6) Structure and Morphology

The X-ray diffraction (XRD) pattern of the Na/$Na_x$Sn electrode at the 5th discharge state was measured in a Swagelok-type cell equipped with a Be window. The result in FIG. 2c demonstrates the presence of $Na_{3.7}$Sn and $Na_{2.25}$Sn. No obvious peaks of metallic Na appeared due to the amorphous structure with the little amount. The morphology of this electrode was examined on scanning electron microscopes (SEM, 6390 and TESCAN VEGA3). The SEM image in FIG. 2d presents $Na_{3.75}Sn$ and $Na_{2.2}Sn$ particles were surrounded by metallic Na.

Example 2: Preparation of $Na/Na_xSn$ (0.22:1 Molar Ratio) Electrode Material In this example, a mixed $Na/Na_{3.75}Sn$ (0.22:1 molar ratio) electrode material has been prepared.

(1) Preparation of $Na/Na_xSn$ (0.22:1 Molar Ratio) Material

The coin cells were assembled according to step (1) and (2) in example 1. The capacity limitation is used instead of voltage cut-off. A capacity limitation of 600 mAh g$^{-1}$ during discharge was adopted to control the metallic Na plating amount. A cut-off voltage of 0.6 V is used during charge. $Na/Na_xSn$ (0.22:1) mixed phases were obtained at the discharge state.

(2) Electrochemical Performances

Each battery was discharge and charge cycled at a current density of 400 mA g$^{-1}$. The capacity was calculated based on the weight of Sn. The discharge and charge curves in the first four cycles and the cyclic performance are reported in FIGS. 3a and 3b.

Similarly, there is a small irreversible capacity originating from SEI formation in the first cycle and the coulombic efficiency of is 75%. The discharge plateaus at ~0.2 and ~0.1 V correspond to the formation of $Na_{3.75}Sn$. A small additional plateau at ~−0.05V appeared, indicative of the plating of Na. Note that part of metallic Na could be formed at a voltage between 0 and −0.05V. The amount of metallic sodium is estimated based on its capacity contribution. A stable and long cyclic performance was achieved for 160 cycles with all coulombic efficiencies of more than 98.5%.

(3) Structure and Morphology.

The X-ray diffraction (XRD) pattern of the $Na/Na_{3.75}Sn$ electrode at the 5th discharge state was measured in a Swagelok-type cell equipped with a Be window. The result in FIG. 3c demonstrates the presence of $Na_{3.75}Sn$ and $Na_{2.25}Sn$. No obvious peaks of metallic Na appeared due to the amorphous structure with this amount. The morphology of this electrode was examined on scanning electron microscopes (SEM, 6390 and TESCAN VEGA3). The SEM image in FIG. 3d presents $Na_{3.75}Sn$ and $Na_{2.25}Sn$ particles were coated by metallic Na.

Example 3: Preparation of $Na/Na_{3.7}Sn$ (1:1 Molar Ratio) Electrode Material In this example, a mixed $Na/Na_{3.75}Sn$ (1:1 molar ratio) electrode material has been prepared.

(1) Preparation of $Na/Na_{3.75}Sn$ (1:1 Molar Ratio) Material

The coin cells were assembled according to example 1. The capacity limitation is used instead of voltage cut-off. A capacity limitation of 800 mAh g during discharge was adopted to control the metallic Na plating amount. A cut-off voltage of 0.6 V is used during charge. $Na/Na_{3.75}Sn$ (1:1) mixed phases were obtained at the discharge state.

(2) Electrochemical Performances

Each battery was discharge and charge cycled at a current density of 400 mA g$^{-1}$. The capacity was calculated based on the weight of Sn. The discharge and charge curves in the first four cycles and the cyclic performance are reported in FIGS. 4a and 4b.

These results show there is a small irreversible capacity and a low coulombic efficiency of 75% in the first cycle, attributed to the formation of the SEI layers. The discharge plateaus at ~0.2 and ~0.1 V correspond to the formation of Na—Sn alloys. The third plateau at ~−0.05V is attributed to the plating of Na. It should be mentioned that part of metallic Na could be formed at a higher voltage than −0.05V. The presence of metallic Na is also evidenced by the plateau at around 0.05 V vs Na/Na$^+$ during charge. The amount of metallic Na is calculated based on its capacity during charge. Stable cyclic behaviors were obtained in the following 60 cycles with all coulumbic efficiencies of more than 96%.

(3) Structure and Morphology

The X-ray diffraction (XRD) pattern of the $Na/Na_{3.75}Sn$ electrode at the 5th discharge state was measured in a Swagelok-type cell equipped with a Be window. The result in FIG. 4c demonstrates the presence of $Na_{3.75}Sn$. No obvious peaks of metallic Na appeared due to the amorphous structure with this amount. The morphology of this electrode was detected by scanning electron microscopes (SEM, 6390 and TESCAN VEGA3). The SEM image in FIG. 4d presents $Na_{3.75}Sn$ particles were embedded in metallic Na.

Example 4: Preparation of $Na/Na_{3.75}Sn$ (1.7:1 Molar Ratio) Electrode Material In this example, a mixed $Na/Na_{3.75}Sn$ (1.7:1 molar ratio) electrode material has been prepared.

(1) Preparation of $Na/Na_{3.75}Sn$ (1.7:1 Molar Ratio) Material

The coin cells were assembled similar to the previous procedure. The capacity limitation is used instead of voltage cut-off. A capacity limitation of 1,000 mAh g$^{-1}$ during discharge was adopted to control the metallic Na plating amount. A cut-off voltage of 0.6 V is used during charge. $Na/Na_{3.75}Sn$ (1.7:1 molar ratio) mixed phases were obtained at the discharge state.

(2) Electrochemical Performances

Each battery was discharge and charge cycled at a current density of 400 mA g$^{-1}$. The capacity was calculated based on the weight of Sn. The discharge and charge curves in the first four cycles and the cyclic performance are reported in FIGS. 5a and 5b.

These results show there is a small irreversible capacity and a low coulombic efficiency of 80% in the first cycle, attributed to the formation of the SEI layers. The discharge plateaus at ~0.2 and ~0.05 V correspond to the formation of Na—Sn alloys. The third plateau at ~−0.05V is attributed to the plating of Na. Part of metallic Na could be formed between 0 and −0.1 V. The presence of metallic Na is demonstrated by the plateau at around 0.05 V vs Na/Na during charge. The amount of metallic Na is calculated from its capacity during charge. Stable cyclic behaviors were obtained in the following 50 cycles with all coulombic efficiencies of more than 96%. A fluctuation of Coulombic efficiency is observed after 50 cycles.

(3) Structure and Morphology

The X-ray diffraction (XRD) pattern of the $Na/Na_{3.75}Sn$ electrode at the 5th discharge state was measured in a Swagelok-type cell equipped with a Be window. The result in FIG. 6c demonstrates the presence of $Na_{3.75}Sn$. A sharp peak at 29.5° originated from metallic Na. The morphology of this electrode was examined on scanning electron microscopes (SEM, 6390 and TESCAN VEGA3). The SEM image in FIG. 6d presents most $Na_{3.75}Sn$ particles were covered by metallic Na.

Example 5: Preparation of $Na/Na_{3.75}Sn$ (4:1 in Molar) Electrode Material In this example, a mixed $Na/Na_{3.75}Sn$ (4:1 in molar) electrode material has been prepared.

(1) Preparation of Na/Na$_{3.75}$Sn (4:1 in Molar) Material

The coin cells were assembled similar to the previous procedure. The capacity limitation is used instead of voltage cut-off. A capacity limitation of 1,500 mAh g$^{-1}$ during discharge was adopted to control the metallic Na plating amount. A cut-off voltage of 0.6 V is used during charge. Na/Na$_{3.75}$Sn (4:1) mixed phases were obtained at the discharge state.

(2) Electrochemical Performances

Each battery was discharge and charge cycled at a current density of 400 mA g$^{-1}$. The capacity was calculated based on the weight of Sn. The discharge and charge curves in the first four cycles and the cyclic performance are reported in FIGS. 6a and 6b.

These results show there is a small irreversible capacity and a low coulombic efficiency of 75% in the first cycle, attributed mainly to the formation of the SEI layers. The discharge plateaus at ~0.2 and ~0.05 V correspond to the formation of Na—Sn alloys. The third plateau at ~−0.05V is attributed to the plating of Na. Part of metallic Na could be formed between 0 and −0.05 V. The presence of metallic Na is demonstrated by the plateau at around 0.05 V vs Na/Na during charge. The amount of metallic Na is calculated based on its capacity during charge. Stable cyclic behaviors were obtained in the following 50 cycles with all coulombic efficiencies of more than 96%. A fluctuation of Coulombic efficiency is observed after 50 cycles.

(3) Structure and Morphology

The X-ray diffraction (XRD) pattern of the Na/Na$_{3.75}$Sn electrode at the 5th discharge state was measured in a Swagelok-type cell equipped with a Be window. The result in FIG. 6c demonstrates the presence of Na$_{3.75}$Sn. A sharp peak at 29.5° originated from metallic Na. The morphology of this electrode was examined on scanning-electron microscopes (SEM, 6390 and TESCAN VEGA3). The SEM image in FIG. 6d presents most Na$_{3.75}$Sn particles were covered by metallic Na.

Example 6: Preparation of Na/Na$_{3.75}$Sn (anode)—Na$_{3.5}$V$_2$(PO$_4$)$_2$F$_3$ (Cathode) Full Na-Ion Batteries The Na$_{3.5}$V$_2$(PO$_4$)$_2$F$_3$ (NVPF) is prepared according to previous work disclosure by Tarascon et al. (Nature Communications, 7:10308). It is mixed with 20 wt. % carbon black and used as a cathode to couple with Sn electrode for making the full cell. Sn electrode is made according to example 1, which serves as an anode. To initiate the formation of Na/Na$_x$Sn mixed phase, a mass ratio of 6:1 is employed for NVPF:Sn. The cell is firstly charged at a capacity limitation of 600 mAh/g based on the weight of Sn at a current density of 400 mA/g (based on the weight of Sn). It gives a small discharge capacity of 274 mAh/g due to the formation of SEI on the anode surface. In the second charge to 600 mAh/g, the Na/Na$_x$Sn (in a molar ratio of around 0.22:1) will be formed in the anode side. The cells will be operated with a NVPF cathode and a Na/Na$_x$Sn anode in the following cycles. The full cell also delivers much more stable capacity than the normal NVPF-Sn cell as shown in FIG. 4b.

What is claimed is:

1. An electrode material comprising a mixed phase, wherein the mixed phase comprises a first phase comprising, metallic sodium and a second phase comprising at least one sodium-tin binary alloy having the formula NaxSn, wherein X is 0.1-3.75, wherein the electrode material comprises a greater amount by mass of the at least one sodium-tin binary alloy than the mass of metallic sodium, and the molar ratio of metallic sodium to the at least one sodium-tin binary alloy is 0.01:1 to 4:1.

2. The electrode material of claim 1, wherein the electrode material comprises particles of the at least one sodium-tin binary alloy and metallic sodium attached thereamong.

3. The electrode material of claim 1, wherein the electrode material comprises substantially no crystalline metallic sodium.

4. The electrode material of claim 1, wherein the molar ratio of metallic sodium to the at least one sodium-tin binary alloy is 0.01:1 to 0.22:1.

5. The electrode material of claim 1, wherein the at least one sodium-tin binary alloy comprises Na$_{3.75}$Sn or Na$_{3.75}$Sn and Na$_{2.25}$Sn.

6. The electrode material of claim 1 further comprising at least one conductive carbon material.

7. The electrode material of claim 6, wherein the at least one conductive carbon material is selected from the group consisting of graphene, graphite, Super P, carbon fiber, and carbon black.

8. The electrode material of claim 1 further comprising at least one electrode binder.

9. The electrode material of claim 8, wherein the at least one electrode binder is sodium carboxymethylcellulose.

10. The electrode material of claim 6 further comprising at least one electrode binder; the molar ratio of metallic sodium to the at least one sodium-tin binary alloy is 0.01:1 to 1:1; and the at least one sodium-tin binary alloy comprises Na$_{3.75}$Sn or Na$_{3.75}$Sn and Na$_{2.25}$Sn.

11. The electrode material of claim 10, wherein the at least one conductive carbon material is Super P and carbon fiber; and the at least one electrode binder is sodium carboxymethylcellulose.

12. A method of preparing the electrode material of claim 1, the method comprising the step of: providing a cell comprising a Sn electrode; a counter electrode which can provide Na+; and an electrolyte comprising Na$^+$; and charging or discharging the cell to below 0 volts versus a Na/Na$^+$ reference electrode thereby forming the electrode material of claim 1.

13. The method of claim 12, wherein the cell is charged or discharged at a capacity less than 1,600 mAh g$^{-1}$ of Sn in the Sn electrode.

14. The method of claim 12, wherein the cell is charged or discharged at a capacity between 400 to 800 mAh g$^1$ of Sn in the Sn electrode.

15. The method of claim 12 further comprising the steps of contacting Sn particles, at least one conductive carbon material, and at least one electrode binder thereby forming a mixture; ball milling the mixture; and coating the mixture on a copper foil thereby forming the Sn electrode.

16. An electrode material prepared according to the method of claim 12.

17. A battery comprising the electrode material of claim 1.

18. The battery of claim 17, wherein the battery comprises a cathode comprising Na$_{3.5}$V$_2$(PO$_4$)$_2$F$_3$ (NVPF).

19. The battery of claim 18, wherein the electrode has a specific capacity of 400 to 800 mAh g$^{-1}$ and has a capacity retention of greater than 90% after 50 cycles.

* * * * *